US005184706A

United States Patent [19]

Christenson

[11] Patent Number: 5,184,706

[45] Date of Patent: Feb. 9, 1993

[54] POLYMERIC COMPOSITE DISCHARGE CHUTES FOR CONCRETE HAVING A WEAR RESISTANT LINER

[75] Inventor: Ronald E. Christenson, Kasson, Minn.

[73] Assignee: McNeilus Truck & Manufacturing, Inc., Dodge Center, Minn.

[21] Appl. No.: 902,756

[22] Filed: Jun. 23, 1992

Related U.S. Application Data

[63] Continuation of Ser. No. 775,451, Oct. 15, 1991, abandoned, which is a continuation-in-part of Ser. No. 470,915, Jan. 26, 1990, Pat. No. 5,056,641.

[51] Int. Cl.[5] .............................................. B65G 11/00

[52] U.S. Cl. ...................................... 193/2 R; 193/5; 193/10; 193/25 A

[58] Field of Search ................ 193/10, 2 R, 2 A, 4–6, 193/25 C, 25 A; 366/68

[56] References Cited

U.S. PATENT DOCUMENTS

| | | | |
|---|---|---|---|
| 2,968,382 | 1/1961 | Oury | 193/6 |
| 4,054,194 | 10/1977 | Davis | 193/2 R X |
| 4,198,043 | 4/1990 | Timbes et al. | 193/2 R X |
| 4,529,660 | 7/1985 | Helm | 193/2 R X |
| 4,645,055 | 2/1987 | Griese et al. | 193/2 R |
| 4,796,887 | 1/1989 | Sternhagen | 193/2 R X |
| 5,035,313 | 2/1991 | Smith | 193/25 A X |

OTHER PUBLICATIONS

P. 20 of MTM ® Mixer Parts Catalog (date not given).
Freeman Chemical Corp. '5 pages of specification re physical properties of nylon materials Oct. 1987.

*Primary Examiner*—D. Glenn Dayoan
*Attorney, Agent, or Firm*—Merchant, Gould, Smith, Edell, Welter & Schmidt

[57] ABSTRACT

An improved discharge chute assembly for use with a concrete mixing truck includes improved chute components which are fabricated from a fiberglass reinforced polyurethane structural frame possessing necessary flexural and impact properties and a polyurethane liner possessing necessary wear resistance and hardness. The polymeric materials tends to remain smooth during wear and permit chutes according to the invention to be manufactured much lighter than those heretofore known.

28 Claims, 6 Drawing Sheets

POLYMERIC COMPOSITE DISCHARGE CHUTES FOR CONCRETE HAVING A WEAR RESISTANT LINER

This is a continuation of application Ser. No. 07/775,451 filed Oct. 15, 1991, now abandoned which is a Continuation-In-Part of application Ser. No. 07/470,915, filed Jan. 26, 1990 now U.S. Pat. No. 5,056,641.

BACKGROUND OF THE INVENTION

1. Field of the Invention

This invention relates to systems for mixing and dispensing concrete. More specifically, this invention relates to chutes for guiding concrete from the discharge end of a concrete mixer to a desired location.

2. Description of the Prior Art

Concrete mixing trucks, such as those manufactured by the assignee of this invention, McNeilus Truck and Manufacturing Corporation of Dodge Center, Minn., are widely used in the construction industry for preparing and transporting a concrete mixture to a desired construction site.

In order to guide concrete into a set of forms or equivalent molding structure, most mixing trucks in commercial use today include a collector into which the discharged concrete is accumulated prior to deposit onto the chute system, a pivotable main discharge chute, a second chute, known as a fold-out chute, which folds out from the main chute, and, optionally, an extension chute which connects to the fold-over chute and/or additional extension chutes which connect to one another for extending the chute system.

In order to withstand the stress and abrasion created by the flux of wet concrete, discharge chute components need to possess a great deal of strength and wear resistance. At present, manufacturers have relied upon thick gauge sheet metal to construct chute components with the necessary strength and wear characteristics. Metal chute components have proven effective in guiding concrete. However, their weight makes the chute assembly difficult to assemble, disassemble and reposition.

Another disadvantage with metal discharge chute components is their tendency to oxidize or otherwise corrode after prolonged use. This type of degradation, in conjunction with normal abrasive wear, can cause the guide surfaces of chute components to become roughened, thereby impairing their efficiency for guiding and making it more difficult to clean the guide surfaces after use.

Another problem which is present in existing discharge chute assemblies involves the connections which are used to join extension chutes to each other and to upstream chutes. Most existing systems use a simple hook-loop type connection to make such a connection. Such connections, however, tend to become jammed with wet concrete, which eventually hardens. In addition, clothing can be caught on the sharp hooks and other edges of such joints. Furthermore, prior art joints are often difficult to fasten and release, particularly by a single person.

It is clear that there has existed a long and unfilled need in the art for a discharge chute component which is lighter in weight, less susceptible to roughening of its guide surfaces, and provides a safer and more reliable joint structure than chute components heretofore known, without any significant loss in strength and/or wear resistance.

SUMMARY OF THE INVENTION

The objectives outlined above may be attained by the present invention which is directed to a discharge chute of the type adapted for guiding a concrete mixture from the discharge end of a concrete mixer truck to a desired location which includes an elongate chute wall having a concave inner guide surface and a convex outer surface, structure connected to the chute wall for reinforcing the chute wall against bending in the longitudinal direction, and structure adapted for joining an upstream end of the chute wall to an ancillary guide structure for receiving a concrete mixture. The chute may be fabricated with a structural frame constructed from a composite of about 55 to 65 wt % polyurethane and about 35 to 45 wt % fiberglass and a wear resistant liner having a paddle test wear resistance of at least 50% of abrasion resistant steel laminated over that surface of the structural frame which will be contacted by the concrete mixture. The discharge chute of the present invention is more efficient and less cumbersome than chutes heretofore known while maintaining the necessary strength and wear resistance.

According to a second aspect of the invention, a discharge chute assembly according to the invention may include a first chute having an upstream end which is adapted for connection to an ancillary guide structure, and a downstream end; a second chute having an upstream end and a downstream end which is adapted for connection to downstream chute structure; and structure for releasably joining the first chute to the second chute, the joining structure being releasable by raising the downstream end of the second chute with respect to the upstream end of the second chute while the first chute remains stationary, whereby the second chute may be removed with minimal exertion.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

1. Structure

Figure 1:
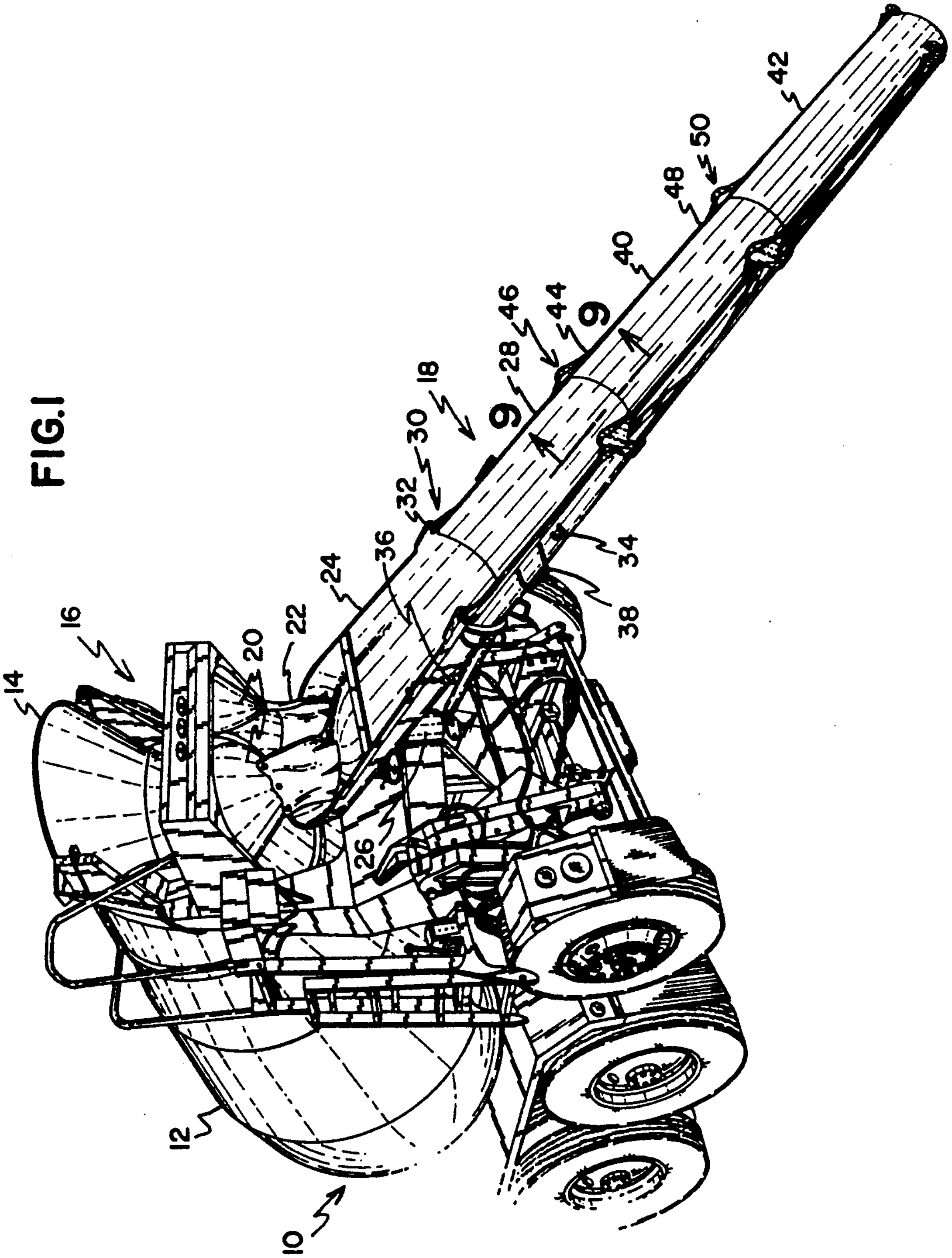
FIG. 1 is a perspective view of a mobile concrete mixing and delivery system according to a first preferred embodiment of the invention.

Referring now to the drawings, wherein like reference numerals designate corresponding structure throughout the views, and referring in particular to FIG. 1, a mixing truck 10 includes a mixing drum 12 for mixing and dispensing concrete, a charge hopper 14 for charging the mixing drum 12, and a discharge mechanism 16 for collecting and guiding concrete mixture into a discharge chute assembly 18. The discharge mechanism 16 includes a pair of discharge funnel guides 20 and a flexible guide curtain 22 for guiding concrete mixture into a main discharge chute 24. In a manner that is common in the art, main discharge chute 24 is adjustably mounted with respect to a chassis of mixing truck 10 by a pivot mechanism 26. As a result, main discharge chute 24 may be pivoted toward a set of forms or other location where concrete mix is to be applied.

As is additionally shown in FIG. 1, a second, fold-over chute 28 is mounted to a downstream end of main discharge chute 24 by a hinge type joint 30. Hinge type joint 30 is of standard construction and includes a set of pivot pins 32 about which fold-over chute 28 may pivot with respect to the body of main discharge chute 24. When fold-over chute 28 is in its operative position, as is illustrated in FIG. 1, its longitudinal axis is substantially coincident with a longitudinal axis of main discharge chute 24. During periods of non-use such as when mixing truck 10 is in motion, the main body of fold-over chute 28 may be pivoted to a position over main discharge chute 24. In this latter position, fold-over chute 28 may be held in place by means of a retaining hook 36, which engages a bracket 34 on fold-over chute 28. A pair of handles 38 are molded into a side surface of fold-over chute 28 for pivoting discharge chute assembly 18 about the axis provided by pivot mechanism 26.

Looking again to FIG. 1, discharge chute assembly 18 further includes a first extension chute 40 and at least a second extension chute 42. First extension chute 40 has an upstream end 44 which is releasably joined to a downstream end of foldout chute 28 by a first releasable extension chute connecting joint 46. Second extension chute 42 is joined to a downstream end 48 of first extension chute 40 by a second releasable chute connecting joint 50 which is identical in purpose and construction to first releasable extension chute connecting joint 46. The construction of first and second releasable extension chute connecting joints 46, 50 is an important part of the invention, and will be explained in greater detail hereinbelow.

Optionally, an end-chute may be employed for purposes of attempting to prevent continued attachment of extension chutes beyond an established safe limit. An end-chute is not depicted in the figures but would be identical to the extension chutes 40,42 with the second releasable chute connecting joint 50 at the downstream end 48 removed from the chute.

Figure 2:
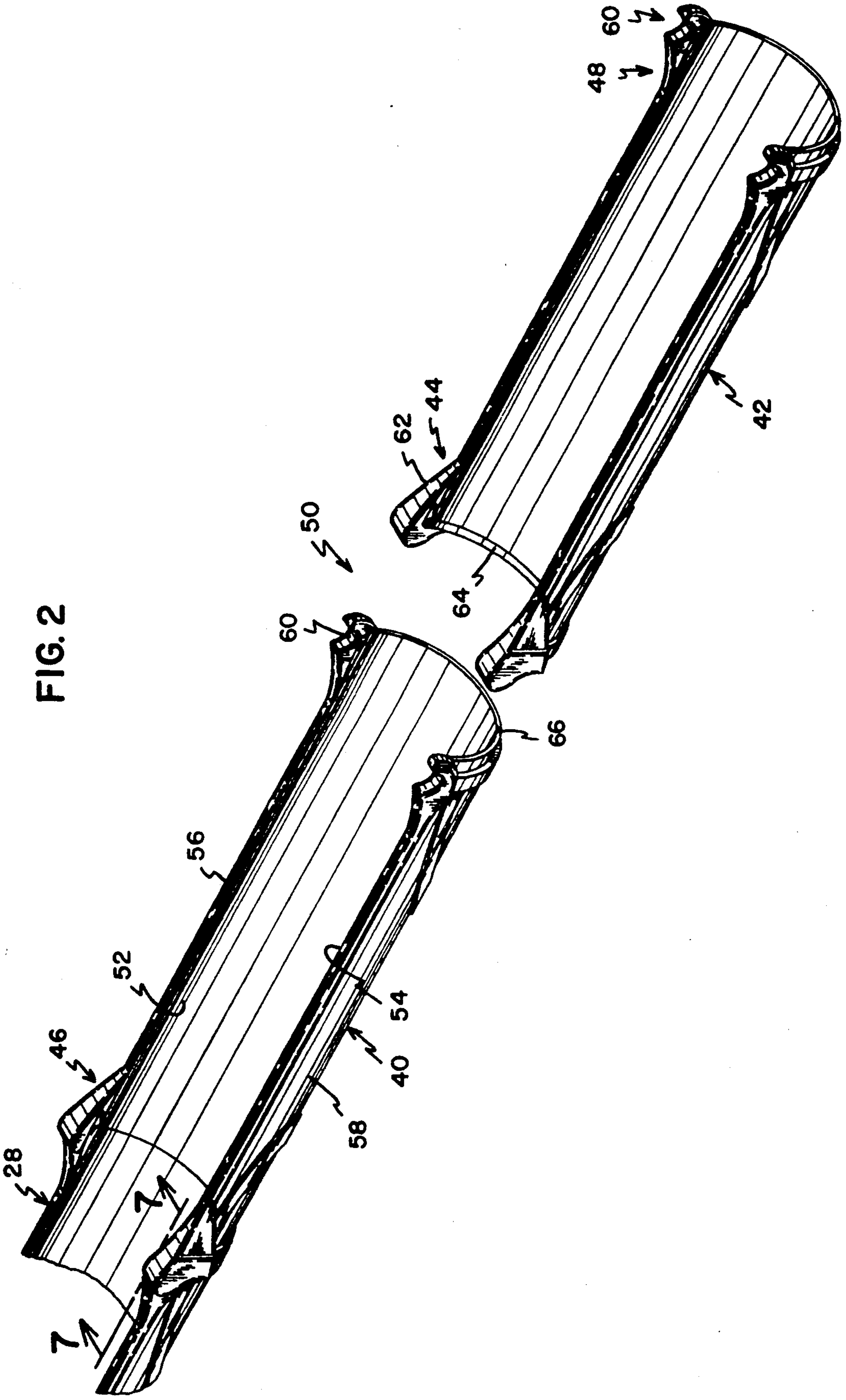
FIG. 2 is a fragmentary exploded perspective view of a chute assembly according to the embodiment of FIG. 1.
Figure 5:
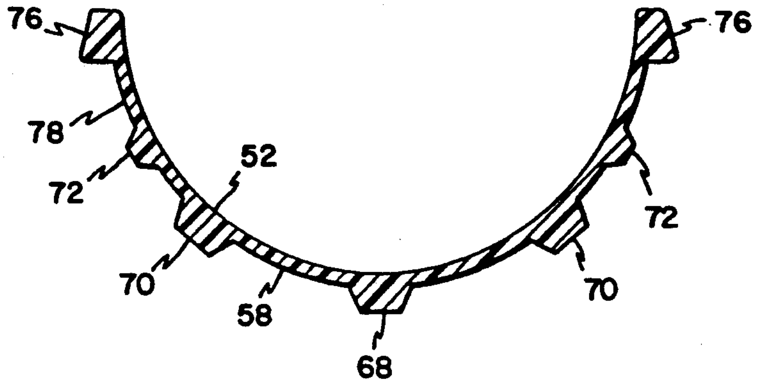
FIG. 5 is a cross sectional view taken along lines 5—5 in FIG. 4.

Referring now to FIGS. 2 and 5, first extension chute 40, which is identical in construction to second chute 42, includes a chute wall 78 which is shaped to define a concave inner guide surface 52 between a first chute rim 54 and a first chute rim 56. Chute wall 78 further defines a convex outer surface 58 which is substantially concentric with the concave inner guide surface 52. Second extension chute 42 is similarly constructed.

The main chute 24, fold-over chute 28, and first 40 and second 42 extension chutes include a structural frame 200 which is constructed from a first material selected to provide structural integrity to the chute 24,28,40,42 and a wear resistant liner 300 over the concave inner guide surface 52 of the structural frame 200 which is constructed from a second material selected to withstand the chemical and physical abrasion effected by the flow of a concrete mixture over that surface. The chutes 24,28,40,42 are generally about 3 to 4 feet in length as an appropriate compromise between handleability (decreased length equals decreased weight and cumbersomeness) and number of units necessary for normal operation (decreased length equals increased number of units required).

As is shown in FIG. 2, a downstream end of first extension chute 40 is provided with a pair of symmetrically constructed cammed joint projections 60 which are constructed so as to be received within a corresponding pair of cammed socket housings 62. The details of construction for the cammed joint projections 60 and cammed socket housings 62 will be discussed in appropriate detail with reference to FIGS. 6 and 7 below. A projecting lip 66 extends from the downstream end of first extension chute 40 and is receivable within an inner lip-receiving recess 64 which is defined in an inner guide surface of the upstream end 44 of second extension chute 42. This allows the inner guide surface 52 of first extension chute 40 to overlap the corresponding inner guide surface in second extension chute 42 in the region which is proximate connecting joint 50 so as to prevent leakage of concrete mixture from chutes 40, 42 at joint 50.

Figure 3:
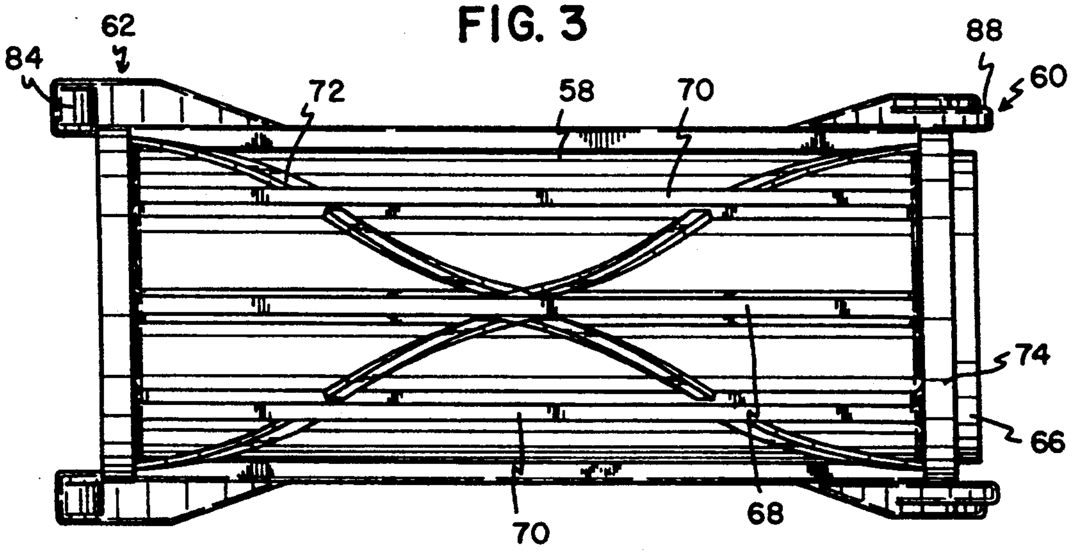
FIG. 3 is a bottom isolational view of a component of the chute assembly that is illustrated in FIGS. 1 and 2.
Figure 4:
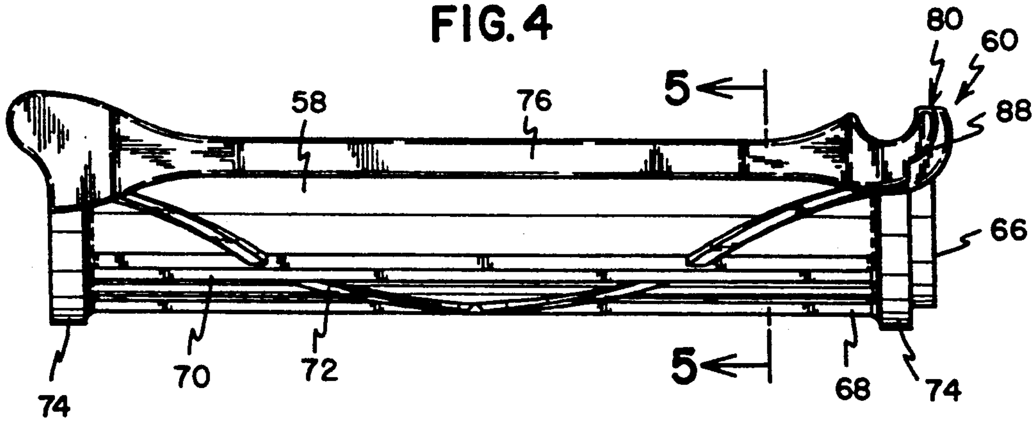
FIG. 4 is a side elevational view of the component depicted in FIG. 3.

Referring now to FIGS. 3-5, the construction of an extension chute 40, 42 will now be discussed. If desired, the chute wall 78 may be reinforced by incorporating any combination of central 68, side 70 and/or diagonal 72 ribs. For reinforcing the chute wall 78 against bending in the longitudinal direction, a longitudinal center stiffening rib 68 extending from the outer surface 58 of the chute wall 78 may be employed along the longitudinal axis of the chute wall 78. In addition, a pair of longitudinal side stiffening ribs 70 may be provided on each side of the center stiffening rib 68 along the side portions of the convex outer surface 58. Both the longitudinal center stiffening rib 68 and the longitudinal side stiffening ribs 70 could be formed as unitary components with and fabricated of the same material as chute wall 78. For reinforcing chute wall 78 against torsional forces which might result from twisting one of the chutes 24,28,40,42, four diagonal cross bracing ribs 72 may be employed such as shown in FIG. 3. Each of the cross bracing ribs 72 could also be formed as unitary components with and fabricated of the same material as the convex outer surface 58 of chute wall 78. The cross bracing ribs shown in FIG. 3 extend from a mid-point of the longitudinal center stiffening rib 68 to a thickened top edging portion of the chute 40,42 which defines the first and second chute rims 54,56.

In order to avoid molding difficulties created because of the presence of the large "channels" required in the mold to produce these ribs 68,70,72 it is generally prefered to eliminate these ribs 68,70,72 to the extent possible based upon the flexural modulus of the material employed to manufacture the chute 24,28,40,42. It has been discovered that these ribs 68,70,72 may be eliminated when the chutes 24,28,40,42 are constructed from the preferred materials indicated below.

Each chute 24,28,40,42 may be further provided with a thickened end edging portion 74 which is constructed to withstand the compressive forces which are created at the joints 46, 50.

Figure 6:
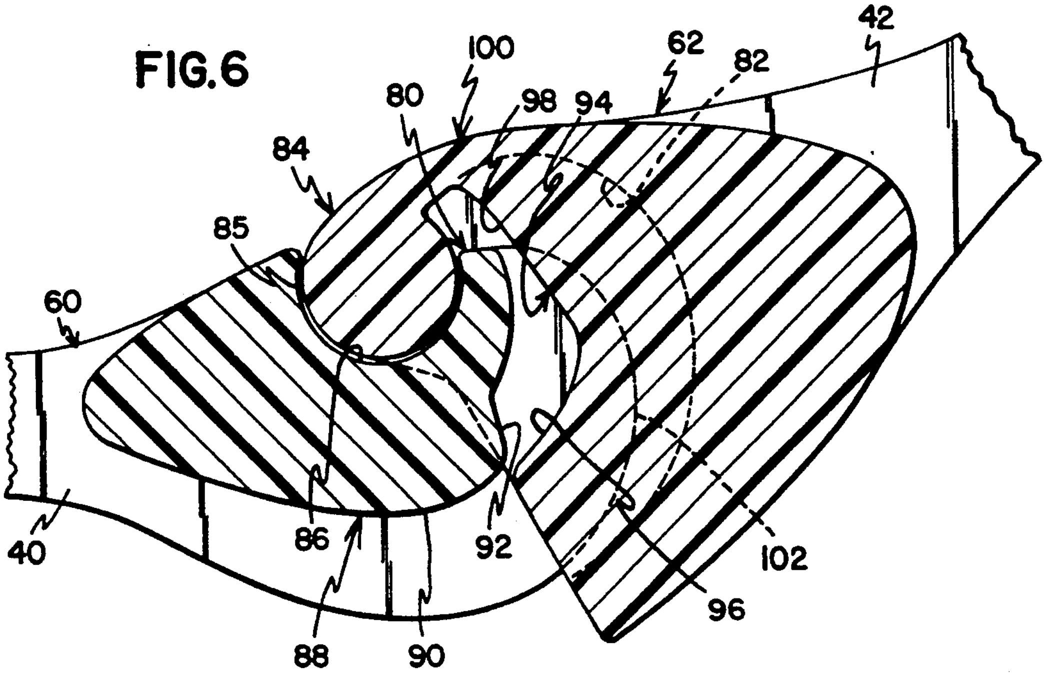
FIG. 6 is a first diagrammatical cross-sectional view taken along lines 7—7 in FIG. 2 illustrating a releasable extension chute connecting joint according to the embodiment of FIGS. 1-5 in a first, released position.
Figure 7:
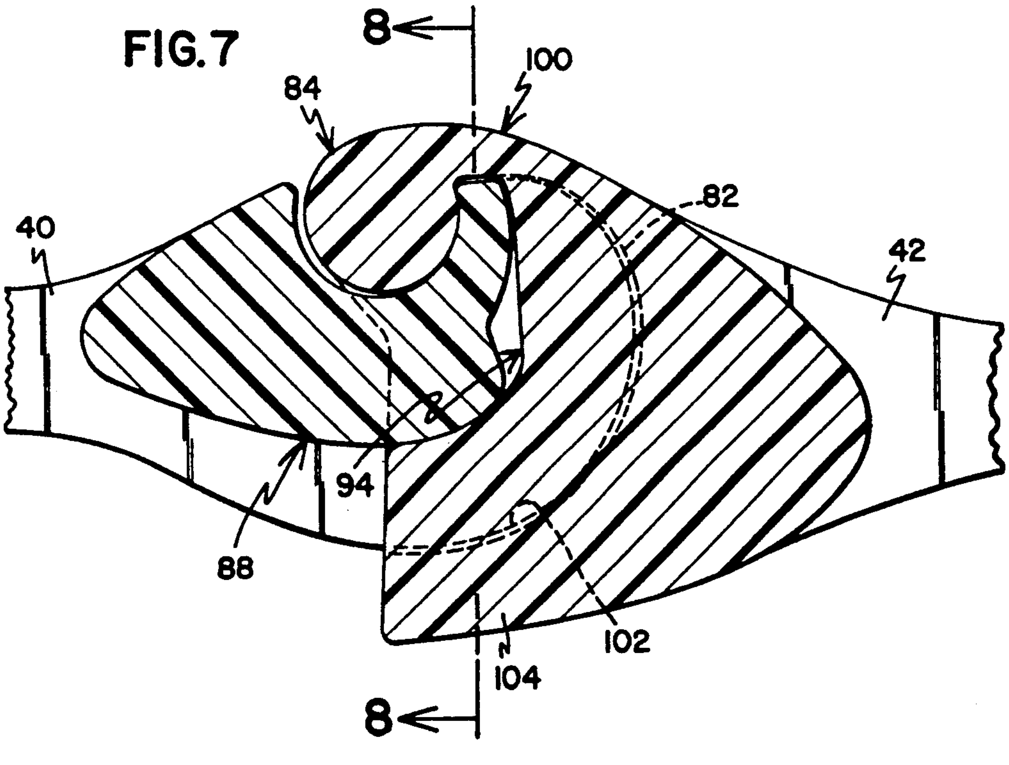
FIG. 7 is a diagrammatical cross-sectional view similar to FIG. 6, with the releasable extension chute connecting joint depicted in a second, locked position.
Figure 8:
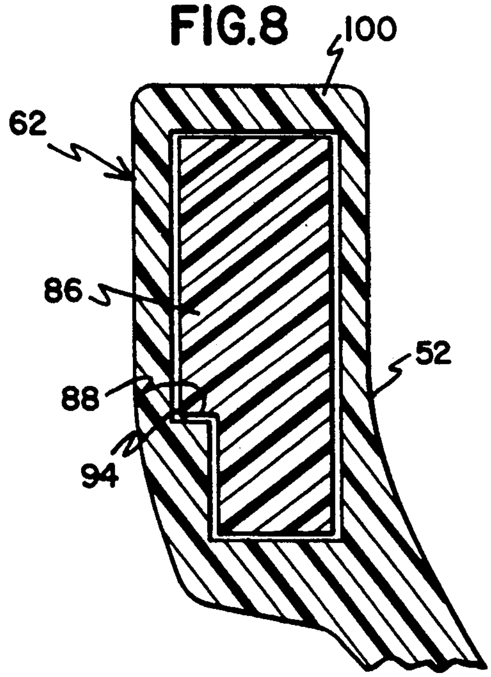
FIG. 8 is a cross-sectional view taken along lines 8—8 in FIG. 7.
Figure 9:
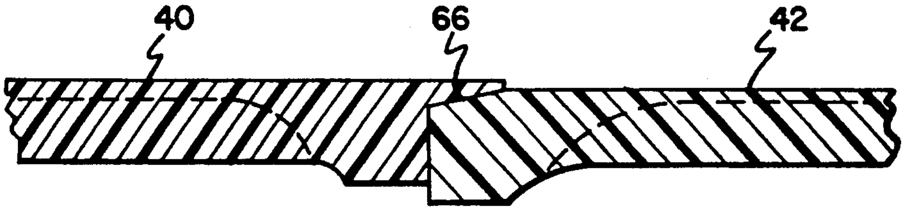
FIG. 9 is a cross-sectional view taken along lines 9—9 in FIG. 1.
Figure 10:
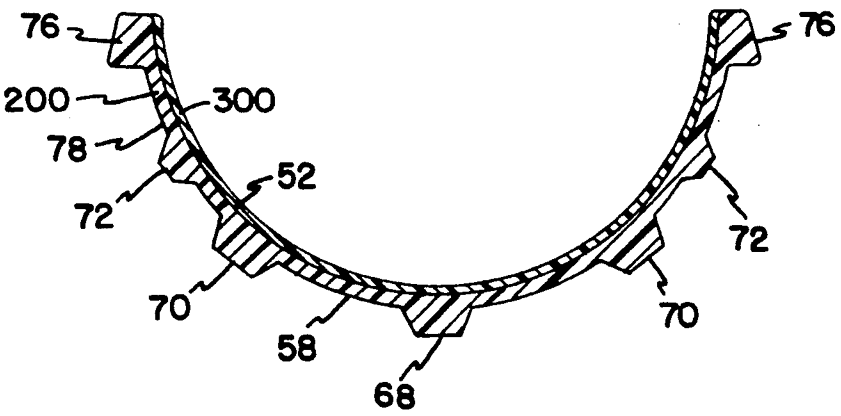
FIG. 10 is a cross sectional view of the extension chute depicted in FIGS. 1-5 wherein a wear resistant liner has been placed onto the chute.

Looking now to FIGS. 6 and 7, cammed joint projection 60 includes a hook member 80 which is also visible in FIG. 4. As may be seen in FIGS. 6 and 7, hook member 80 is receivable within a complementary hook-receiving recess which is defined in cammed socket housing 62 by a surface 82. Cammed socket housing 62 further includes a pin portion 84 which has a convex, downwardly facing engagement surface 85. As may be seen in FIGS. 6 and 7, the engagement surface 85 of pin portion 84 is configured so as to be tightly receivable within a socket which is defined in cammed joint production 60 by a surface 86.

As may be seen in FIGS. 4, 6 or 7, a projecting cam structure on cammed joint projection 60 defines a first cam surface 88 having a first section 90 and a second section 92. A second cammed surface 94 is defined by cammed socket housing 62. Second cammed surface 94 includes a first section 96 and a second section 98. The first and second cammed surfaces 88, 94 are shaped so that the respective first cam sections 90, 96 will engage when the joint 50 is in the locked position.

It should be understood that the structure of first releasable extension chute connecting joint 46 is identical to the structure which is described above with reference to joint 50.

2. Materials

The structural frame 200 must be fabricated from a material possessing sufficient flexural strength, flexural modulus and impact strength to permit design of chutes 24,28,40,42 which avoid structural failure and excessive deformation during normal use at a weight per linear foot of chute which is less than standard steel chutes. Specifically, desired materials for the construction of chutes 24,28,40,42 possess sufficient flexural strength, flexural modulus and impact strength to permit design of chutes 24,28,40,42 possessing the desired structural integrity at a weight per linear foot of less than about 10 lbs/ft, most preferably about 8 lb/ft.

Generally, materials possessing a flexural modulus of at least 38,000 psia, preferably 40,000 psia, a flexural modulus of at least 500,000, preferably 1,000,000, an Izod complete break impact strength of at least 20 ft·lb/in, preferably at least 35 ft·lb/in, an Izod hinge break impact strength of at least 25 ft·lb/in, and an Izod partial break impact strength of at least 16 ft·lb/in. are generally suitable for use in constructing the structural frame 200 of the chute 24,28,40,42. Materials possessing a flexural modulus and/or an Izod impact strength of less than those limits set forth above are unreasonably susceptible to unsuitable performance, such as excessive deflection under load, and/or failure, such as fracturing during transportation on a concrete mixing truck 10.

We have discovered that a polymeric composite of about 55 to 65 wt % polyurethane and about 35 to 45 wt % fiberglass provides the desired structural integrity. A suitable fiberglass reinforced polyurethane is available from Mobay Corporation of Rosemount, Ill. under the tradename Baydur STR TM. Baydur STR TM includes a two component polyurethane formulated for use in combination with a fiberglass preform in a reaction injection molding system to form structural composite parts. The manufacturing process includes formation of the fiberglass preform by known techniques, such as through vacuum molding, placement of the fiberglass preform into the reaction injection mold, and then feeding the separate isocyanate and polyol components of the polyurethane into the mold in accordance with standard reaction injection molding techniques. The fiberglass preform may be of a continuous strand or random chopped and woven type, preferably the fiberglass is present as a woven particle preform.

Various physical properties and characteristics of Baydur STR TM is provided in Table One along with an indication of the ASTM test method utilized to obtaining the data.

We have surprisingly discovered that discharge chutes configured in accordance with the present invention and constructed from Baydur STR TM having a loading of about 35 to 45 wt % fiberglass possess sufficient structural integrity to maintain vertical displacement of the chute to less than 0.8 in/ft, generally 0.5 in/ft, when horizontally cantilevered from a concrete mixing drum with a static concentrated shear load of 1000 lb located at the distal end.

We further believe that a polymeric composite of about 55 to 70 wt % of a hybrid polyurea and about 30 to 45 wt % fiberglass can provide the desired structural integrity. A suitable fiberglass reinforced polyurea system is available from Resign Design International of Conyers, Ga. under the tradename RD #257-400 TM. RD #257-400 TM includes a two component polyurea formulated for use in combination with a fiberglass preform in a reaction injection molding system to form structural composite parts. The manufacturing process is substantially identical to that outlined above with respect to the polyurethane system except that the polyurea components are employed.

Various physical properties and characteristics of RD #257-400 TM is provided in Table Two along with an indication of the ASTM test method utilized to obtaining the data, preferably the composite has a specific gravity of less than about 1.6, and more preferably has a specific gravity of less than about 1.5.

Unfortunately, based upon testing conducted in accordance with the paddle test protocol set forth below, we established that the wear resistance of the Baydur STR TM polyurethane composite is less than about 5% of the wear resistance of abrasion resistant steel such that a chute 24,28,40,42 constructed from the material would be quickly worn away by the passage of concrete in contact with the material. However, we were able to resolve this problem and render a chute 24,28,40,42 manufactured from Baydur STR TM sufficiently wear resistant by incorporating a lining 300 of a wear resistant material over that surface of the structural frame 200 which will be contacted by the concrete mixture, namely the concave inner guide surface 52. Preferably, the wear resistant material possesses a paddle test wear resistance of at least 50% of abrasion resistant steel and a durometer hardness of at least about 85A. Paddle test wear resistance is a measure of the resistance of a material to the physical and chemical erosive effects of a flow of a concrete mixture against the material. Durometer hardness is a measure of the resistance of a material to scratching and indentation. Suitable wear resistant materials include the high durometer polyurethanes available from a number of suppliers. A specific family of polyurethanes suitable for use as the wear resistant liner 300 is available from Mobay Corporation of Rosemount, Ill. under the tradename Bayflex TM. Various physical properties and characteristics of several specific Bayflex TM polyurethanes is provided in Table Three along with an indication of the ASTM test method utilized to obtaining the data. These polyurethanes possess a hardness durometer of 85A to 95A and a paddle test wear resistance of 100% to 250% of abrasion resistant steel.

The thickness of the wear resistant liner 300 depends upon the desired useful life of the liner and the particular material employed. Generally, for purposes of constructing a chute 24,28,40,42 which will survive at lease three years of normal use on a concrete mixing truck, the liner 300 should have a thickness selected by application of the equation set forth below. However the thickness should generally never be less than about 0.1 inch to prevent inherent variations in coating thickness rom causing premature failure of the chute 24,28,40,42.

$$\text{Thickness} = (100) \cdot \frac{(0.25 \text{ inch})}{(\% \text{ paddle test wear resistance})}$$

The thickness of the wear resistant liner 300 can be decreased slightly in a transverse direction from the central portion thereof as abrasion is not as severe along the sides. Generally, a gradual decrease with a maximum decrease of about 10% to 50% at the extreme transverse ends of the liner 300 can be achieved without causing initial failure to occur along the sides.

The liner 300 may be designed as either a permanently applied coating or a replaceable component. When intended as a permanent coating, the material from which the liner 300 is constructed must be sufficiently compatible with the material from which the structural frame 200 is constructed to permit sufficient physical and/or chemical bonding to occur so that the liner 300 does not delaminate from the structural frame 200. A combination of a polyurethane liner 300 and a fiberglass reinforced polyurethane composite structural frame 200 is particularly suitable as they permit contemporaneous molding of the liner 300 and structural frame 200 by reaction injection molding and provide excellent bonding between the components. When intended as a replaceable component, the liner 300 must be provided with some mechanism for permitting releasable yet secure attachment of the liner 300 to the structural frame 200 which prevents inadvertent release of the liner during transportation and storage and prevents shifting of the liner 300 during use. A number of suitable mechanisms could be employed to achieve these objectives including specifically, but not exclusively, releasable pawl and ratchet combinations on the liner 300 and structural frame 200 respectively, transverse rib and trough combinations on the liner 300 and structural frame 200 respectively, etc.

Since the polymeric composite is stronger and more durable than steel based on a given weight of material, a chute 24,28,40,42 according to the invention can be made lighter in weight and yet have equivalent strength to metallic chutes which are in use today.

We have reason to believe that a polymeric composite chute 24,28,40,42 manufactured with RD 257-400 TM polurea would not require a wear resistant liner 300 because of a decreased loading of fiberglass and an increase in the wear resistance of polyurea in relation to polyurethane.

The charge hopper 14 and discharge mechanism 16 may also be constructed from these polymeric composites for the same reasons that the dischare chute assembly 18 would be constructed from such materials. However, a larger variety of polymeric materials is available for use in construction of these components as the flexural modulus of the material need not be quite as large as that required for the discharge chute assembly 18 as these components are not subjected to such extreme external forces.

3. Operation

In operation, mixing truck 10 is positioned adjacent a set of forms or other concrete molds. Fold-over chute 28 is unlimbered and extended to its operative position. Handles 38 are used to pivot fold-out chute 28 toward the forms or molds. At this time, an operator positions the upstream end 44 of first extension chute adjacent the cammed joint projections 60 of fold-over chute 28. The cammed socket housing 62 of first extension chute 40 are kept adjacent the cammed joint projections 60 of fold-over chute 28 while the downstream end of first extension chute 40 is lifted with respect to the upstream end of first extension chute 40. As is shown in FIG. 6, the pin portion 84 of each of the cammed socket housings 62 is inserted in the corresponding pin-receiving socket defined by surfaces 86 in the cammed joint projections 60. At the same time, the convex outer surface 102 of cammed joint projection 60 is inserted into the hook-receiving recess which is defined by a surface 82. At this time, the downstream end of first extension chute 40 may be lowered. As this happens, the first cam surface 88 engages the second cam surface 94, thereby locking the cammed joint projection 60 into the cammed socket housing 62, as is shown in FIG. 7. As a result, the first extension chute 40 will be securely attached to fold-over chute 28 until it is removed. Second extension chute 42 and subsequent chutes may be connected to the downstream end of first extension chute 40 in a manner which is identical to that described above.

When it is desired to remove first extension chute 40 from fold-over chute 28, the downstream end of first extension chute 40 is lifted with respect to the first releasable extension chute connecting joint 46. This unlocks first cam section 90 from the respective first cam section 96 and permits removal of the cammed joint projection 60 from socket housing 62 in a sequence which is opposite from that described above with reference to the connection procedure.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

TABLE ONE

| Property | Test Method ASTM | Units | STR Composite Materials Continuous Strand Glass Mat Percentage by Weight 48% | 35% | 54% |
|---|---|---|---|---|---|
| General | | | | | |
| Specific gravity | D792 | | 1.55 | 1.39 | 1.62 |
| Thickness | | in. | 0.125 | 0.250 | 0.250 |
| Mechanical | | | | | |
| Tensile Strength | D412 | psi | 34,000 | 24,000 | 33,000 |
| Elongation | D412 | ~% | 5 | 5 | 5 |
| Flexural modulus | D790 | psi | 1,400,000 | 1,170,000 | 1,530,000 |
| Flexural strength | D790 | psi | 45,000 | 38,000 | 46,000 |
| Notched izod | D256 | ft-lb/in. | 17 | 13 | 17 |
| Thermal | | | | | |
| Heat deflection | D648 | °F. @ 264 psi | 370 | 376 | 388 |
| CLTE | D696 | in./in. (10°)/°F. | <20 | <20 | <20 |
| Water absorption | | % after 24 hrs. | 0.23 | — | — |
| | | % after 1 wk. | 0.63 | — | — |
| Linear shrinkage | | % | 0.06 | 0.10 | .06 |
| Heat sag (1 hr @ 250° F.) | | | | | |
| 4 in. overhang | | in. | — | — | — |
| 6 in. overhang | | in. | — | — | — |

TABLE TWO

| Property | Test Method ASTM | Units | RD 257-400 Composite Materials Glass Mat Percentage by Weight 25% | 35% | 45% |
|---|---|---|---|---|---|
| General | | | | | |
| Specific gravity | D792 | | 1.37 | 1.45 | 1.55 |
| Mechanical | | | | | |
| Tensile Strength | D412 | psi | 15,000 | 25,350 | 35,600 |
| Elongation | D412 | % | 3 | 2 | 1 |
| Flexural modulus | D790 | psi | 750,000 | 1,200.000 | 1,570,000 |
| Notched izod | D256 | ft-lb/in. | 11 | 17 | 19 |
| Thermal | | | | | |
| Heat distortion | D648 | °F. @ 264 psi | 480 | 500 | 530 |

TABLE THREE

| Property | Test Method ASTM | Units | BayFlex 28 TM | | BayFlex 32 TM | | BayFlex 742 TM |
|---|---|---|---|---|---|---|---|
| General | | | | | | | |
| Specific gravity | D792 | | 0.4 | 0.6 | 0.4 | 0.6 | 0.8 |
| Thickness | | in. | 0.5 | 0.5 | 0.5 | 0.5 | 0.5 |
| Mechanical | | | | | | | |
| Tensile strength | D638 | psi | 300 | 470 | 220 | 370 | 1,300 |
| Elongation | D638 | % | 115 | 130 | 145 | 155 | 100 |
| Flexural modulus | D790 | psi | 960 | 1400 | 350 | 660 | 19,000 |
| Tear strength, die C | D624 | psi | 35 | 50 | 26 | 43 | — |
| Compressive strength | D695 | psi | 20 | 80 | 15 | 70 | 300 |
| Hardness (durometer) | | Ascale | 55 | 70 | 50 | 65 | — |
| | | Dscale | — | — | — | — | 50 |

| Property | Test Method ASTM | Units | Bayflex MP-3000 | Bayflex MP-5000 | Bayflex MP-10000 |
|---|---|---|---|---|---|
| General | | | | | |
| Specific gravity | D792 | | 1.1 | 1.1 | 1.1 |
| Thickness | | in. | 0.125 | 0.125 | 0.125 |
| Mechanical | | | | | |
| Tensile strength | D412 | psi | 1,600 | 1,900 | 2,200 |
| Elongation | D412 | % | 450 | 360 | 300 |
| Flexural modulus | D790 | psi | 3,000 | 5,000 | 10,000 |
| Tear strength, die C | D624 | psi | 200 | 230 | 240 |
| Compressive set, 25% deflection & | D395 | % | 50 | 18 | 18 |

TABLE THREE-continued

| | | | | | |
|---|---|---|---|---|---|
| 22 hr | | | | | |
| Hardness (durometer) | D2240 | A scale | 70 | 85 | 90 |
| | | D scale | — | 30 | 40 |
| NBS abrasion | | Abrasive Index | 190 | 235 | 270 |
| Taber abrasion, H-18 wheel | | mg loss/ 1000 cycles | 540 | 430 | 250 |
| Notched Izod | D256 | ft-lb/in. | — | — | — |
| Thermal | | | | | |
| Low temperature brittleness | D746 | Passes °C. | −50 | −50 | −50 |
| Water immersion dimensional stability | | mm/mm | 0.015 | 0.014 | 0.014 |
| Water absorption | | % after | 3.5 | 2.9 | 2.8 |
| | | 240 hrs. | 5.1 | 5.0 | 5.0 |
| CLTE | D696 | in./in. $(10^{-6})$/°F. | 95 | 95 | 92 |
| Linear shrinkage | | % | 1.35 | 1.35 | 1.35 |
| Heat sag (1 hr @ 250° F.) | | | | | |
| 4 in. overhang | | in. | — | — | — |
| 6 in. overhang | | in. | — | — | — |

| Property | Test Method ASTM | Units | Bayflex 110-35 | Bayflex 110-50 | Bayflex 110-80 |
|---|---|---|---|---|---|
| General | | | | | |
| Specific gravity | D792 | | 1.1 | 1.1 | 1.1 |
| Thickness | | in. | 0.125 | 0.125 | 0.125 |
| Mechanical | | | | | |
| Tensile strength | D412 | psi | 3,400 | 3,800 | 3,500 |
| Elongation | D412 | % | 260 | 280 | 110 |
| Flexural modulus | D790 | psi | 35,000 | 50,000 | 80,000 |
| Tear strength, die C | D624 | psi | 520 | 600 | — |
| Compressive set, 25% deflection & 22 hr | D395 | % | 16.4 | 16.0 | 16.6 |
| Hardness (durometer) | D2240 | A scale | — | — | — |
| | | D scale | 55 | 60 | 60 |
| NBS abrasion | | Abrasive Index | — | — | — |
| Taber abrasion, H-18 wheel | | mg loss/ 1000 cycles | — | — | — |
| Notched Izod | D256 | ft-lb/in. | — | 11 | 4 |
| Thermal | | | | | |
| Low temperature brittleness | D746 | Passes °C. | — | — | — |
| Water immersion dimensional stability | | mm/mm | — | — | — |
| Water absorption | | % after | 0.2 | — | — |
| | | 240 hrs. | — | — | — |
| CLTE | D696 | in./in. $(10^{-6})$/°F. | 87 | 82 | 80 |
| Linear shrinkage | | % | 1.35 | 1.35 | 1.35 |
| Heat sag (1 hr @ 250° F.) | | | | | |
| 4 in. overhang | | in. | 0.3 | 0.12 | 0.08 |
| 6 in. overhang | | in. | 1.37 | 0.5 | 0.5 |

PADDLE WHEEL TEST FOR ASSESSING RELATIVE WEAR RESISTANCE

Protocol

1. Form a $1\frac{7}{8}$" wide by $2\frac{7}{8}$" long production sheet sample of the material to be tested and securely attach the sample to the distal end of a first rotatable radial arm which is positioned to rotate within the chamber defined by a receptacle.

2. Form an identically dimensioned production sheet sample of a reference material against which the tested material is to be compared (generally AR 200 steel) and securely attached the sample to the distal end of a second rotatable radial arm which is similarly positioned within the chamber defined by the receptacle.

3. Attach a removable protective layer of material, such as steel, proximate the center of the test sample and reference sample for purposes of preventing wear to that portion of the sample.

4. Accurately measure the thickness of the samples within an area located about $\frac{5}{8}$" in from the side of the sample and about $2\frac{1}{4}$" up from the bottom of the sample.

5. Fill the receptacle with a mixture of granite chips, sand, and water so that the rotated samples of test and reference materials will be totally immersed within and forced through the mixture for at least a portion of the circular trajectory of the rotated samples.

6. Rotate the samples through the mixture by means of an electric motor.

7. Rotate the position of the samples from arm to arm every 24 hours during short duration tests and every 48 hours during long duration tests so as to provide each sample with the same amount of time at each arm.

8. Collect the samples after the desired testing period and measure the thickness of the samples at the same locations as when the thickness was originally measured.

9. Compare and record the final measured thickness for each location on the samples with the original thickness at that location. Relate the comparative differences obtained as between the test and reference samples.

I claim:

1. A discharge chute for guiding concrete dispensed from a mixing drum comprising:
(a) a structural frame constructed from a composite of about 55 to 65 wt % polyurethane and about 35 to 45 wt % fiberglass wherein the structural frame defines a longitudinally elongated channel, and
(b) a wear resistant liner laminated over that surface of the structural frame defining the flow-channel and having a paddle test wear resistance of at least 50% of abrasion resistant steel.

2. The discharge chute of claim 1 wherein the longitudinally elongated channel has a concave cross-sectional configuration.

3. The discharge chute of claim 1 wherein the chute has a longitudinal length of about 3 to 4 feet.

4. The discharge chute of claim 1 wherein the composite has a flexural modulus of at least 500,000.

5. The discharge chute of claim 1 wherein the composite has a flexural modulus of at least 1,000,000.

6. The discharge chute of claim 1 wherein the liner is constructed of a urethane material having a paddle test wear resistance of at least 100% of abrasion resistant steel.

7. The discharge chute of claim 1 wherein the liner is constructed of a urethane material having a paddle test wear resistance of at least 150% of abrasion resistant steel.

8. The discharge chute of claim 1 wherein the liner is constructed of a urethane material having a paddle test toughness of at least 200% of abrasion resistant steel.

9. The discharge chute of claim 1 wherein the liner is constructed of a urethane material having a paddle test toughness of at least 250% of abrasion resistant steel.

10. The discharge chute of claim 1 wherein the liner has a durometer hardness of at least 85A.

11. The discharge chute of claim 6 wherein the urethane material has a durometer hardness of at least 95A.

12. The discharge chute of claim 1 wherein the composite has a specific gravity of less than about 1.6.

13. The discharge chute of claim 1 wherein the composite has a specific gravity of less than about 1.5.

14. The discharge chute of claim 1 wherein the composite has an Izod complete break impact strength of at least 20 ft·lb/in.

15. The discharge chute of claim 1 wherein the composite has an Izod complete break impact strength of at least 35 ft·lb/in.

16. The discharge chute of claim 1 wherein the composite has an Izod hinge break impact strength of at least 25 ft·lb/in.

17. The discharge chute of claim 1 wherein the composite has an Izod partial break impact strength of at least 16 ft·lb/in.

18. The discharge chute of claim 1 wherein the fiberglass is present as a continuous strand preform.

19. The discharge chute of claim 1 wherein the fiberglass is present as a random chopped and woven preform.

20. The discharge chute of claim 1 wherein the fiberglass is present as a woven particle preform.

21. The discharge chute of claim 1 wherein the discharge chute has a maximum vertical displacement of less than 0.8 in/ft when horizontally cantilevered from a fixed proximal longitudinal end with a static concentrated shear load of 1000 lb located at the distal end.

22. The discharge chute of claim 1 wherein the discharge chute has a maximum vertical displacement of less than 0.5 in/ft when horizontally cantilevered with a fixed proximal longitudinal end and a static concentrated shear load of 1000 lb located at the distal end.

23. A discharge chute for guiding concrete dispensed from a mixing drum comprising:
(a) a structural frame having a flexural strength of at least 38,000 psia wherein the structural frame defines a longitudinally elongated flow-channel, and
(b) a wear resistant liner laminated over that surface of the structural frame defining the flow-channel which has a paddle test wear resistance of at least 100% of Abrasion Resistant steel.

24. The discharge chute of claim 23 wherein the polymeric material has a flexural strength of at least 40,000 psia.

25. The discharge chute of claim 23 wherein the discharge chute has a maximum vertical displacement of less than 0.8 in/ft when horizontally cantilevered from a fixed proximal longitudinal end with a static concentrated shear load of 1000 lb located at the distal end.

26. The discharge chute of claim 23 wherein the discharge chute has a maximum vertical displacement of less than 0.5 in/ft when horizontally cantilevered with a fixed proximal longitudinal end and a static concentrated shear load of 1000 lb located at the distal end.

27. The discharge chute of claim 23 wherein the composite has an Izod complete break impact strength of at least 35 ft·lb/in.

28. The discharge chute of claim 23 wherein the liner is constructed of a urethane material having a paddle test toughness of at least 200% of abrasion resistant steel.

* * * * *